US010628870B2

(12) United States Patent
Akkiraju et al.

(10) Patent No.: US 10,628,870 B2
(45) Date of Patent: Apr. 21, 2020

(54) OFFERING PERSONALIZED AND INTERACTIVE DECISION SUPPORT BASED ON LEARNED MODEL TO PREDICT PREFERENCES FROM TRAITS

(71) Applicant: International Business Machines Corporation, Armonk, NY (US)

(72) Inventors: Rama Kalyani T. Akkiraju, Cupertino, CA (US); Haibin Liu, San Jose, CA (US); Jalal U. Mahmud, San Jose, CA (US); Vibha S. Sinha, Santa Clara, CA (US); Yi Wang, Sioux Falls, SD (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 15/289,420

(22) Filed: Oct. 10, 2016

(65) Prior Publication Data

US 2018/0101887 A1 Apr. 12, 2018

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06N 5/022* (2013.01); *G06N 20/00* (2019.01)

(58) Field of Classification Search
CPC ..... G06Q 30/0631; G06N 20/00; G06N 5/022
See application file for complete search history.

(56) References Cited

U.S. PATENT DOCUMENTS 9,904,949 B1 * 2/2018 Tavernier ........... G06Q 30/0631
2006/0106809 A1 5/2006 Faltings et al.
(Continued)

OTHER PUBLICATIONS

List of IBM Patents or Patent Applications Treated as Related, Dec. 8, 2016, 2 pages.
(Continued)

*Primary Examiner* — Jason B Dunham
*Assistant Examiner* — Anand R Loharikar
(74) *Attorney, Agent, or Firm* — Stephen R. Tkacs; Stephen J. Walder, Jr.; William J. Stock

(57) ABSTRACT

A mechanism is provided in a data processing system comprising at least one processor and at least one memory, the at least one memory comprising instructions executed by the at least one processor to cause the at least one processor to implement a personalized interactive decision support system. A personalized product recommendation module executing within the personalized interactive decision support system correlates at least one customer to a set of consumption preferences using a machine learning model based on a set of traits of the at least one customer to form at least one customer-to-preference correlation. The personalized product recommendation module maps a set of products to the set of consumption preferences using a consumption preferences-to-product attribute mapping data structure based on a set of attributes of the set of products to form a set of product-to-preference correlations. The personalized product recommendation module matches the at least one customer to at least one product within a set of products based on the at least one customer-to-preference correlation and the set of product-to-preference correlations to form at least one product recommendation. A visual and interactive decision support module executing within the personalized interactive decision support system presents the at least one product recommendation.

23 Claims, 7 Drawing Sheets

(51) Int. Cl.
*G06N 20/00* (2019.01)
*G06N 5/02* (2006.01)

(56) References Cited

U.S. PATENT DOCUMENTS

| | | | |
|---|---|---|---|
| 2008/0162269 A1* | 7/2008 | Gilbert | G06Q 10/06375 |
| | | | 705/7.31 |
| 2009/0144635 A1* | 6/2009 | Miyazaki | G06F 17/30026 |
| | | | 715/747 |
| 2009/0287678 A1 | 11/2009 | Brown et al. | |
| 2011/0022606 A1* | 1/2011 | Mason | G06F 17/30867 |
| | | | 707/748 |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0054447 A1 | 2/2013 | Ross et al. | |
| 2013/0066886 A1 | 3/2013 | Bagchi et al. | |
| 2014/0067596 A1 | 3/2014 | McGovern et al. | |
| 2014/0214480 A1 | 7/2014 | Jamal et al. | |
| 2014/0278916 A1 | 9/2014 | Nukala et al. | |
| 2015/0178788 A1* | 6/2015 | Weber | H04N 21/252 |
| | | | 705/14.66 |
| 2015/0199645 A1 | 7/2015 | Sulur et al. | |
| 2015/0242891 A1* | 8/2015 | Mimran | G06Q 30/0255 |
| | | | 705/14.53 |
| 2015/0262282 A1* | 9/2015 | Walti | G06Q 30/0631 |
| | | | 705/26.7 |
| 2015/0293925 A1* | 10/2015 | Greenzeiger | G06F 17/30029 |
| | | | 707/734 |
| 2015/0332303 A1 | 11/2015 | Kodali | |
| 2016/0019627 A1* | 1/2016 | Musil | G06Q 30/0631 |
| | | | 705/26.7 |
| 2016/0026920 A1* | 1/2016 | Sullivan | G06N 5/04 |
| | | | 706/11 |
| 2016/0085816 A1* | 3/2016 | Sakai | H04L 67/18 |
| | | | 707/734 |
| 2016/0171558 A1* | 6/2016 | Lehtiniemi | G06Q 30/02 |
| | | | 705/14.66 |
| 2016/0253738 A1* | 9/2016 | Pinckney | G06N 99/005 |
| | | | 705/26.7 |
| 2017/0236131 A1* | 8/2017 | Nathenson | G06Q 30/0201 |
| | | | 705/26.7 |
| 2018/0025405 A1* | 1/2018 | Jones | G06Q 30/0631 |
| 2018/0091865 A1* | 3/2018 | Pearlman | H04N 21/4826 |

OTHER PUBLICATIONS

Dyer, James S. et al., "A Multiattribute Utility Analysis of Alternatives for the Disposition of Surplus Weapons-Grade Plutonium", Operations Research, vol. 46. No. 6. Nov.-Dec. 1998, 14 pages.

High, Rob, "The Era of Cognitive Systems: An Inside Look at IBM Watson and How it Works", IBM Corporation, Redbooks, Dec. 12, 2012, 16 pages.

Keeney, Ralph L., "Identifying and Structuring Values to Guide Integrated Resource Planning at BC Gas", Operations Research, vol. 47. No. 5. Sep.-Oct. 1999, pp. 651-662.

Kirkwood, Craig W. et al., "Improving Supply-Chain-Reconfiguration Decisions at IBM", Interfaces, vol. 35, No. 6, Nov.-Dec. 2005, pp. 460-473.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

Dongxing, Cao et al., "Customer Preference-Based Information Retrieval to Build Module Concepts", Dongxing Cao et al, Advances in Mechanical Engineering (vol. 2013), Article ID 536820, Accepted Jul. 3, 2013, pp. 1-10.

* cited by examiner

US 10,628,870 B2

OFFERING PERSONALIZED AND INTERACTIVE DECISION SUPPORT BASED ON LEARNED MODEL TO PREDICT PREFERENCES FROM TRAITS

BACKGROUND

The present application relates generally to an improved data processing apparatus and method and more specifically to mechanisms for offering personalized and interactive decision support based on learned model to predict preferences from traits.

A decision support system (DSS) is a computer-based information system that supports business or organizational decision-making activities. DSSs serve the management, operations, and planning levels of an organization (usually mid and higher management) and help people make decisions about problems that may be rapidly changing and not easily specified in advance—i.e. decision problems requiring Unstructured and Semi-Structured data analysis.

DSSs include knowledge-based systems. A properly designed DSS is an interactive software-based system intended to help decision makers compile useful information from a combination of raw data, documents, and personal knowledge, or business models to identify and solve problems and make decisions.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement a personalized interactive decision support system. The method comprises correlating, by a personalized product recommendation module executing within the personalized interactive decision support system, at least one customer to a set of consumption preferences using a machine learning model based on a set of traits of the at least one customer to form at least one customer-to-preference correlation. The method further comprises mapping, by the personalized product recommendation module, a set of products to the set of consumption preferences using a consumption preferences-to-product attribute mapping data structure based on a set of attributes of the set of products to form a set of product-to-preference correlations. The method further comprises matching, by the personalized product recommendation module, the at least one customer to at least one product within a set of products based on the at least one customer-to-preference correlation and the set of product-to-preference correlations to form at least one product recommendation. The method further comprises presenting, by a visual and interactive decision support module executing within the personalized interactive decision support system, the at least one product recommendation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
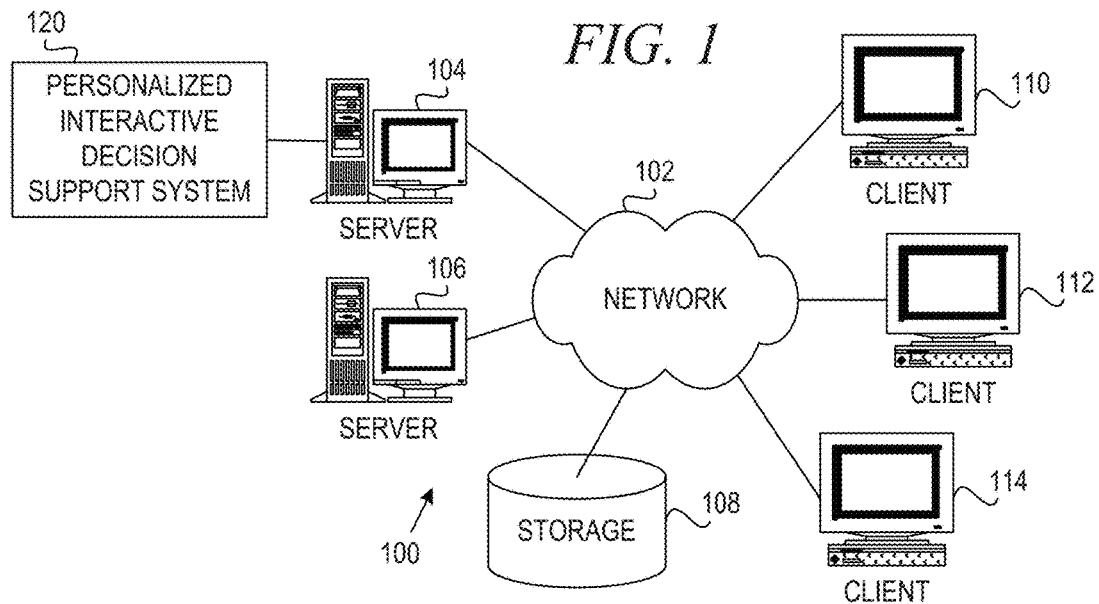
FIG. 1 is an example diagram of a distributed data processing system in which aspects of the illustrative embodiments may be implemented.

Human decision processes are highly interactive, especially when those decisions are complex involving competing objectives, preferences, and constraints. In many complex decision problems, humans seek the assistance of tools to conduct research, discover options, and explore alternatives and tradeoffs before making informed decisions. Each individual is driven by not only his constraints but also by his preferences and personality that are unique to him. A solution that appeals to one individual may not appeal to another. Therefore, decision support tools must take people's personalities and preferences into account. Tradeoffs between value attributes that adequately capture the decision maker's preferences are especially essential in decision problems where multiple attributes are involved.

Most available decision support tools take a specific structured set of solutions and enable the exploration of tradeoffs. However, most of the decision support tools in practice today do not understand the person who is making the decision at a deeper level to personalize the solutions. Most known decision support tools capture the preferences either by explicitly asking the user or by preference elicitation techniques. Often, the process of structuring the attributes and then assessing the tradeoffs can be arduous and prone to mistakes. While these techniques work fine in cases where users are willing to reveal their preferences explicitly via means such as surveys, they often do not work in situations where it is not practical to collect this data or when users are not willing to participate in such a collection process.

In accordance with the illustrative embodiments, a mechanism is provided for offering personalized and interactive decision support to decision makers involving complex multi-objective decision choices. The mechanism of the illustrative embodiments does not explicitly elicit user preferences. The mechanism infers the user's personality, basic values, needs, intent, emotional status, and preferences from various user-generated content sources such as text, audio, video, and images and personalizes the decision alternatives offered to the user. The mechanism also allows customers to decide which of the recommended alternatives to choose by observing different tradeoffs.

In the following description, the illustrative embodiments are described with reference to the financial service domain where products are different investments; however, aspects of the illustrative embodiments are broadly applicable to other domains such as healthcare, retail, travel, etc.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
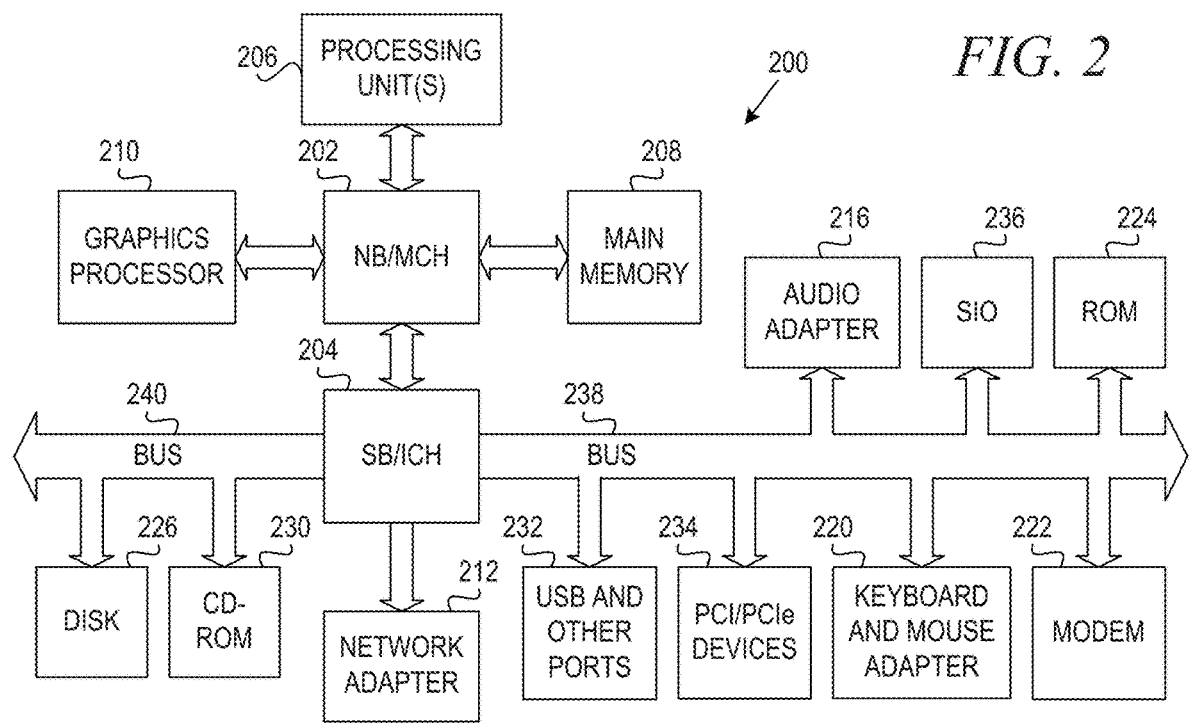
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a personalized interactive decision support system 120. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a personalized interactive decision support system 120.

As noted above, the mechanisms of the illustrative embodiments utilize specifically configured computing devices, or data processing systems, to perform the operations for a personalized interactive decision support system 120. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power® processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the personalized interactive decision support system.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
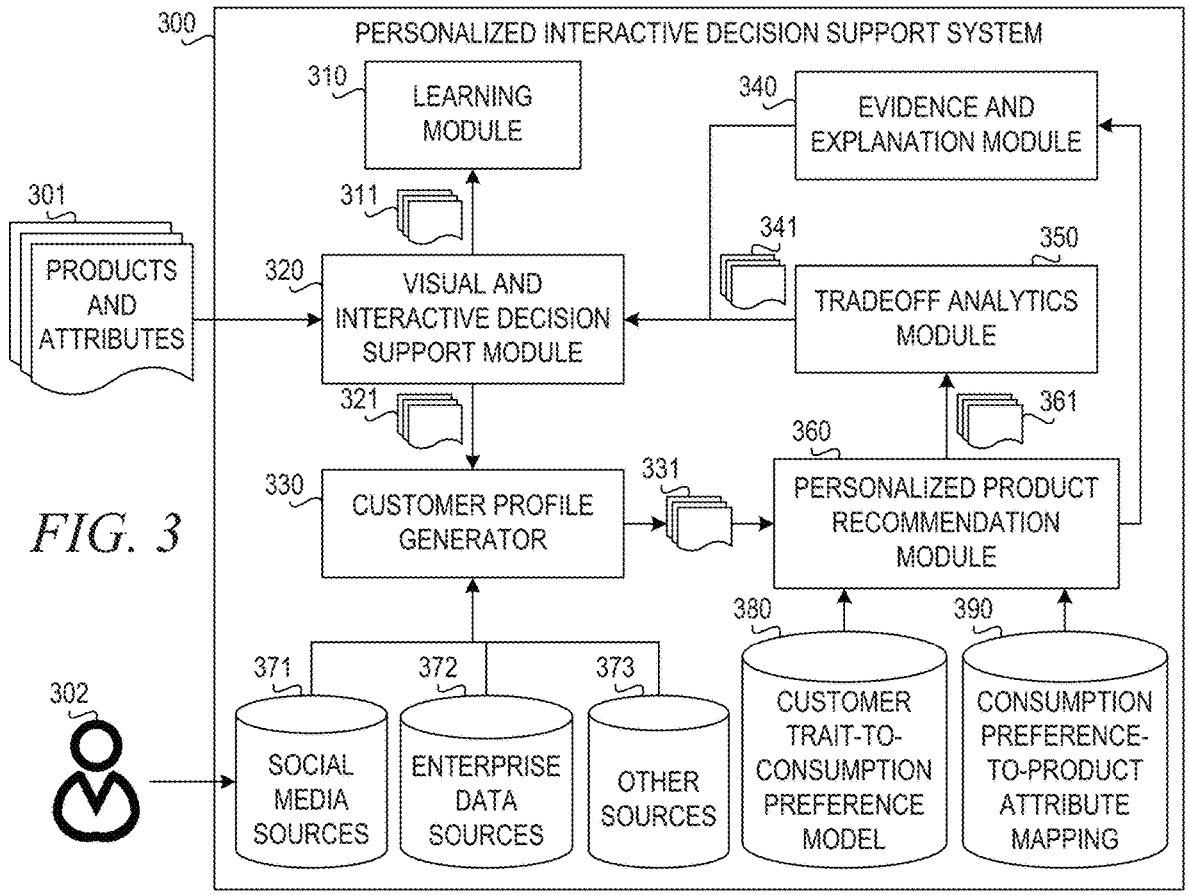
FIG. 3 is a block diagram of a personalized interactive decision support system in accordance with an illustrative embodiment of the illustrative embodiment.

FIG. 3 is a block diagram of a personalized interactive decision support system in accordance with an illustrative embodiment of the illustrative embodiment. Products and attributes 301 are provided to personalized interactive decision support system (DSS) 300. A set of products and a set of attributes for each product are specified. In a financial domain, for example, such products may be different investment choices, and a set of attributes may be long term vs. short term, interest rate, risk indicator, etc.

One approach is to study behaviors and actions and build predictive models based on the available evidence. One can observe the type of investments made by investors historically, obtain their personality traits either by explicitly administering a survey or by using other techniques, and build a model that can predict what kind of people are likely to make what kind of investments. For instance, one may be able to correlate that people who are high extraversion and high excitement-seeking personality traits are likely to make short-term investments. While this kind of approach is useful, there are several limitations. Models built this way are very difficult to explain. Why do people who are extraverted and excitement-seeking tend to invest in short-term investments? It is likely that people with these personality traits are likely to be more risk-taking. Having this insight is extremely helpful in explaining the system Another disadvantage is that one has to observe each behavior that is to be predicated and build models to predict each one. This is a cumbersome process. The coverage of behaviors that one can attain in such systems tends to be low since the explicit numbers of models that are to be observed are very many. The illustrative embodiments present a more general purpose approach to the problem of correlating personality traits with an intermediate canonical, more broad-based consumption preference attributes. These broad-based consumption preference attributes are then mapped on an as-needed basis to a set of product attributes in specific domains. This approach offers much more flexibility and is less brittle. It also offers explainability that is missing in other approaches.

Customer profile generator 330 generates a customer profile for the user 302. For a given customer or user 302, customer profile generator 330 collects and computes a set of traits 331 for the customer 302. The traits comprise personality, basic human value, needs, emotion, interest, life-event, and life-style of the customer. Such traits may be computed from digital footprints (text, audio, video, or image) of the customer available in different customer-generated content sources, including social media data sources 371, enterprise data sources 372, and other sources 373. The traits may also include demographics information of the customer and domain specific profile information, e.g., risk profile or investment goal in the financial domain.

In one embodiment, customer profile generator 330 performs linguistic analysis on the customer-generated content to derive the customer traits 331, including personality traits. Customer profile generator 330 may use existing tools for determining personality traits about the customer. For example, the IBM Watson™ Personality Insights service provides an Application Programming Interface (API) that enables applications to derive insights from social media, enterprise data, or other digital communications. The service uses linguistic analytics to infer individuals' intrinsic personality characteristics, including Big Five, Needs, and Values, from digital communications such as email, text messages, tweets, and forum posts. The service can automatically infer, from potentially noisy social media, portraits of individuals that reflect their personality characteristics.

In one example embodiment, the customer traits may comprise a set of personality traits including openness, conscientiousness, extroversion, agreeableness, and neuroticism. In addition, or in alternative embodiment, the customer traits may comprise a set of needs comprising excitement, harmony, curiosity, ideal, closeness, self-expression, liberty, love, practicality, stability, challenge, and structure. In addition, or in yet another alternative embodiment, the customer traits may comprise a set of values measured along dimensions comprising self-transcendence/helping others, conservation/tradition, hedonism/taking pleasure in life, self-enhancement/achieving success, and open to change/excitement.

Personalized product recommendation module 360 matches customers with products and generates a set of product recommendations 361 based on a customer trait-toconsumption preference model 380 and a consumption preference-to-product attribute mapping 390. In one embodiment, customer trait-to-consumption preference model 380 comprises a set of rules that map customer traits to consumption preferences. In another embodiment, customer trait-to-consumption preference model 380 comprises a machine learning model, such as a linear regression model, to determine a correlation, with a corresponding correlation value, between customer traits and consumer preferences. Based on these correlations, personalized product recommendation module 360 generates the set of consumption preferences.

Personalized product recommendation module 360 also matches consumption preferences with product attributes and generates a set of product recommendations 361 using consumption preferences-to-product attribute mapping 380 based on the derived consumption preferences of one or more customers.

Figure 4:
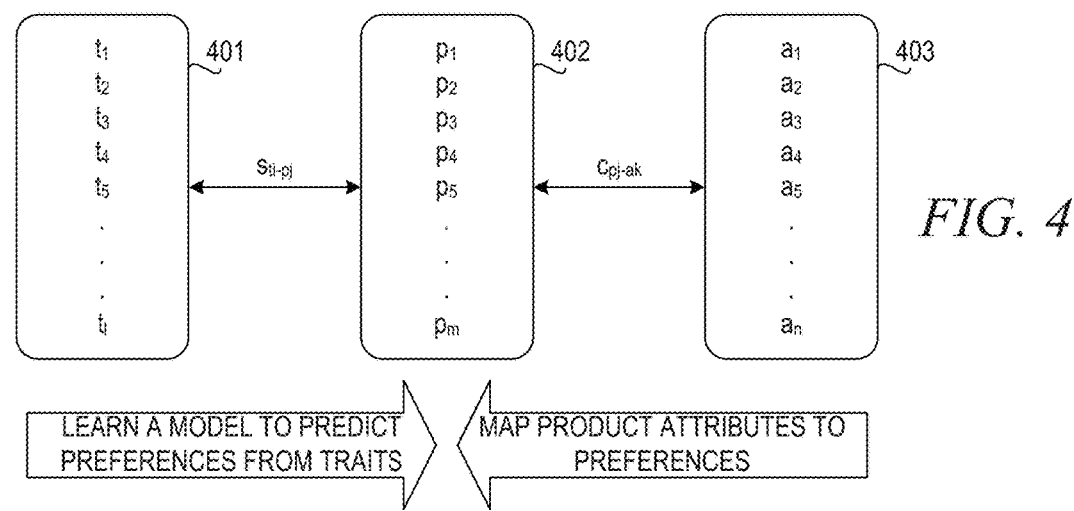
FIG. 4 depicts a model that correlates customer traits to consumption preferences and correlates consumption preferences to product attributes in accordance with an illustrative embodiment.

FIG. 4 depicts a model that correlates customer traits to consumption preferences and correlates consumption preferences to product attributes in accordance with an illustrative embodiment. Let T represent a set of all customer profile traits or attributes 401. Each t represents an individual customer trait. A set of customer traits is represented as follows:

$$T=\{t_1,t_2,t_3,t_4,\ldots,t_l\},$$

where l represents the number of customer traits in the set.

The set P represents a list of all consumption preferences 402. Each preferences is represented by p. Examples of consumption preferences are as follows: high-risk, ergonomic, animal-friendly, short-term, etc. A set of consumption preferences is represented as follows:

$$P=\{p_1,p_2,p_3,p_4,\ldots,p_m\},$$

where m represents the number of consumption preferences.

As stated above, products and attributes 301 provides a plurality of products and a set of product attributes for each product. The set A represents a list of product attributes for a given product or all known product attributes 403. Each attribute is represented by a. An example of a product attribute a may be "investment instrument 15 is associated with high risk. A set of product attributes is represented as follows:

$$A=\{a_1,a_2,a_3,a_4,\ldots,a_n\},$$

where n represents the number of product attributes for a given product or a total number of known product attributes depending on the implementation.

Let the correlation between personality trait $t_i$ and preference $p_j$ be represented by the term $c_{ti\text{-}pj}$, where i and j are the indices for the profile traits in the set T and preferences in set P, respectively. These correlation values may be derived by running statistical analysis on a set of observed data for people with their personality traits and their expressed or observed preferences. Data can be collected via surveys or from transactional data if available. In one embodiment, these correlations $c_{ti\text{-}pj}$ may be stored within customer trait-to-consumption preference model 380.

Similarly, let $c_{pj\text{-}ak}$ represent the correlation between preference $p_j$ and product attribute $a_k$, where j and k are the indices for preferences and product attributes in sets P and A, respectively. Correlation values between product attributes and preferences may be obtained by conducting semantic analysis on product descriptions. In one embodiment, these correlations $c_{pj\text{-}ak}$ may be stored within consumption preference-to-product attribute mapping 390.

Once such a knowledge graph, consisting of customer trait-to-consumption preference model 380 and consumption preference-to-product attribute mapping 390, is built, personalized product recommendation module 360 can query this graph for making suitable matches from both sides. For example, on one hand, people may ask questions as follows:

"In my segment I have a group of people who are highly orderly, highly self-disciplined, highly cautious, and moderate. What are their preferences? What kind of products can I recommend to them?"

These kinds of questions can be addressed by parsing the knowledge graph from left (customer) to right (product), as shown in FIG. 4. First, personalized product recommendation module 360 determines preferences from the correlations associated with the given personality traits. Then, personalized product recommendation module 360 determines which products have attributes that correlate with the identified preferences and recommends those products to those customers as a set of product recommendations 361.

Personalized product recommendation module 360 starts with the given set of customer traits. In the above query, there are four traits. Say a set $Ö_t$ represents this subset of traits, where $Ö_t$ belongs to T. For each trait, personalized product recommendation module 360 retrieves all the correlated preferences whose correlation value is above a specified threshold $\Omega_{tp}$. The subset of preferences retrieved after applying the threshold is represented as $Ø_p$, where $Ø_p$ belongs to P.

Similarly, for each preference in the obtained subset, personalized product recommendation module 360 retrieves all the correlated product attributes that have correlation values above a specified threshold $\Omega_{tp}$. The subset of product attributes obtained from this is represented as $ä_a$, where $ä_a$ belongs to A. Now the matching process can be stated as follows:

For each trait $t_i$ in set $Ö_t$, retrieve all preferences into a set $Ø_p$ whose $c_{ti\text{-}pj} > \Omega_{tp}$. This is a union.

For each preference $p_j$ in set $Ø_p$, retrieve all attributes into a set $ä_a$ whose $c_{pj\text{-}ak} > \Omega_{pa}$.

Those products whose attributes are in set $ä_a$ are the best possible recommendations for people with personality traits in the set $Ö_t$.

In another example, people can ask a question as follows:

"I have to promote products X, Y, and Z. What kind of people would be most interested in these products?"

These kinds of questions may be addressed by parsing the knowledge graph from right (product) to left (customer), as shown in FIG. 4. Personalized product recommendation module 360 associates consumption preferences with product attributes and determines which personality traits correlate with those consumption preferences. Based on that, personalized product recommendation module 360 determines what customers are likely to prefer that specific set of products based on their personality traits. The above algorithm can be traversed in reverse order to answer this question.

The matching and recommendation algorithm can use such rules to compute match scores between investment products and the customer. Tradeoff analytics module 350 uses these findings to perform tradeoff analysis among various dimensions of the funds to choose funds that would appeal to a customer. Tradeoff analytics module 350 provides an optimal set of products and their attributes 341 to visual interactive decision support module. Also, evidence and explanation module 340 provides evidence, such as personality traits, product attributes, and results of tradeoff analysis to visual and interactive decision support module 320. In one embodiment, evidence and explanation module 340 shows the reasoning and mappings the system went through to arrive at the recommendations as a way of showing evidence. In another embodiment, evidence and explanation module 340 generates natural language explanations that shows the reasoning and mappings the system went through to arrive at the recommendations.

Visual and interactive decision support module 320 presents recommendations in an interactive visualization. By using an interactive visualization, visual and interactive decision support module 320 can help the customer decide which of the recommended products to choose by observing different tradeoffs. Such a visualization shows recommended products, at least one customer trait, and at least one product attribute that are used in the matching to compute the recommendation.

Because the visualization is interactive, the customer can manipulate the visualization to give input to cause a change in the matching to better reflect the preference. Learning module 310 continuously improves the underlying matching algorithm through customer feedback. Such feedback is collected through the interactive visualization. Thus, visual and interactive decision support module 320 sends optimal set of products and their attributes 311, as well as customer feedback, to learning module 310. In one embodiment, the learning module 310 then modifies customer trait-to-consumption preference model 380 to reflect the changes made by the customer. For example, if customer trait-to-consumption preference model 380 is rule-based, then learning module 310 modifies the rules to more accurately match customer traits to the desired consumption preferences. If the customer trait-to-consumption preference model 380 is a statistical based machine learning model, such as a linear regression model, then the learning module 310 retrains the statistical based matching model.

In one embodiment, for the financial domain where products are investment funds and available attributes for customers are their Big5 personality traits computed from text, the matching algorithm uses a set of correlations between personality traits and investment risk preference to compute a match score. As an example, risk preference of an individual is correlated to the following personality traits:
  Cautiousness (-ve correlated): Disposed to think through possibilities carefully before acting.
  Orderliness (-ve correlated): Well-organized, tidy, and neat.
  Prone to worry (-ve correlated): Easily overwhelmed in stressful situations.
  Ideal (-ve correlated): Desire perfection and a sense of community.
  Stability (-ve correlated): Seek equivalence in the physical world and favor the sensible, the tried and tested.
  Conservation (-ve correlated): Emphasize self-restriction, order, and resistance to change.

In the above embodiment, personalities drive risk preferences of individuals. The matching algorithm finds a suitable investment option for a given client that suits the personality, risk profile, and investment goals of the client. Once match scores between products and customer are computed, the personalized interactive decision support system can recommend matched products to customers. In one embodiment, each investment fund, based on its risk score is assigned a personality value on selected attributes. Next, funds that have similar personality portrait to the customer's personality are recommended to the customer.

Each fund, based on its risk score is assigned a personality value on selected attributes. The personality portrait of a fund with the highest risk (1.71) has the following personality values:
  Cautiousness 50
  Orderliness 0
  Vulnerability 0
  Ideal 0
  Stability 50
  Conservation 0

The personality portrait of a fund with the lowest risk (0.33) has the following personality values:
  Cautiousness 100
  Orderliness 50
  Vulnerability 50
  Ideal 50
  Stability 100
  Conservation 50

For the financial domain, studies also indicate the following:
  Individuals who are more extraverted tend to engage in short-term investing.
  Individuals higher in neuroticism and/or risk aversion avoid short-term based investment decisions.
  Risk-averse individuals do not engage in long-term investing.
  Individuals who are more open to experience are inclined to engage in long-term investing; however, openness did not predict short-term investing.

Figure 5:
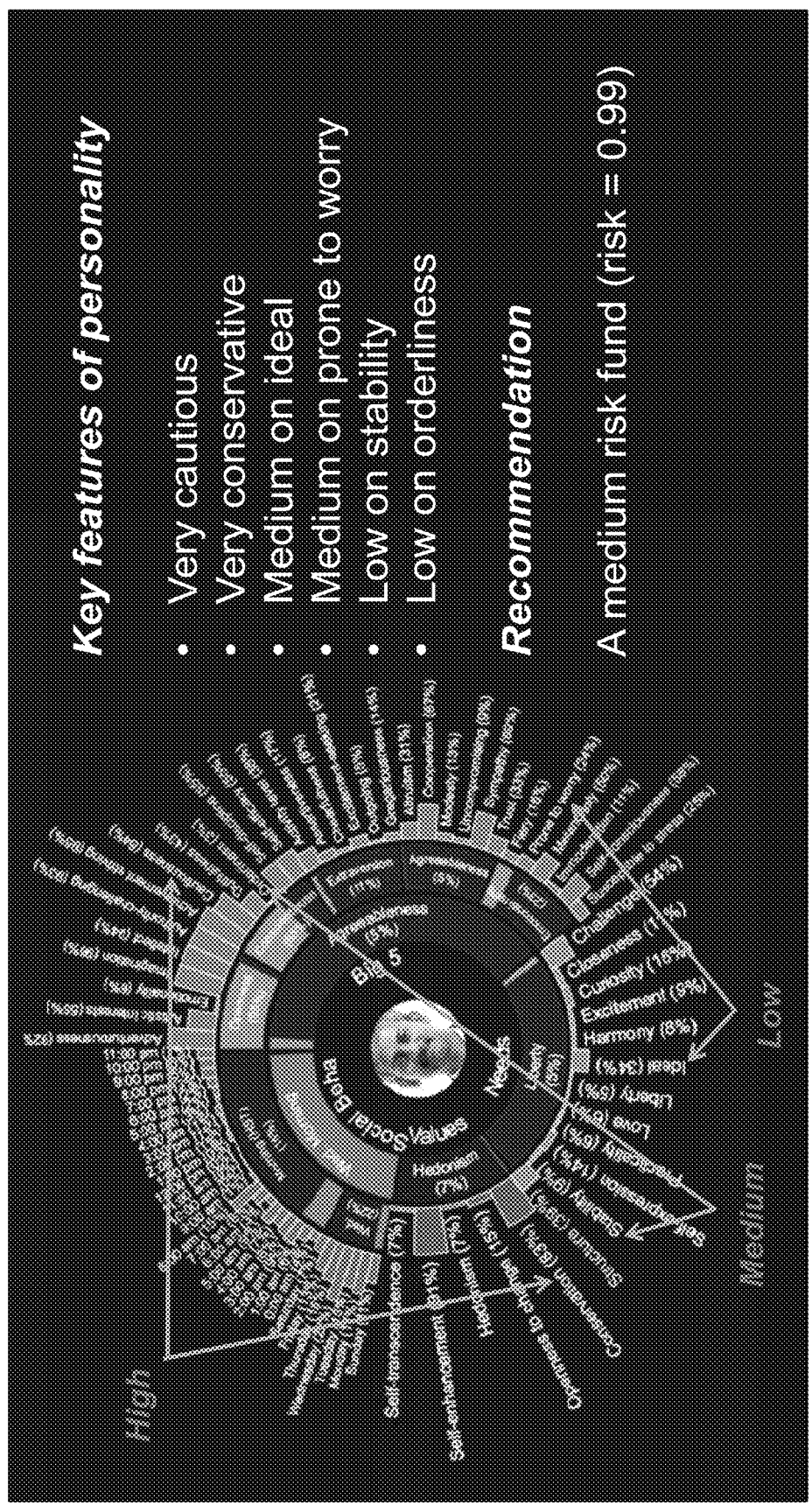
FIG. 5 illustrates a product recommendation for a given customer based on personality traits in accordance with an illustrative embodiment.
Figure 6:
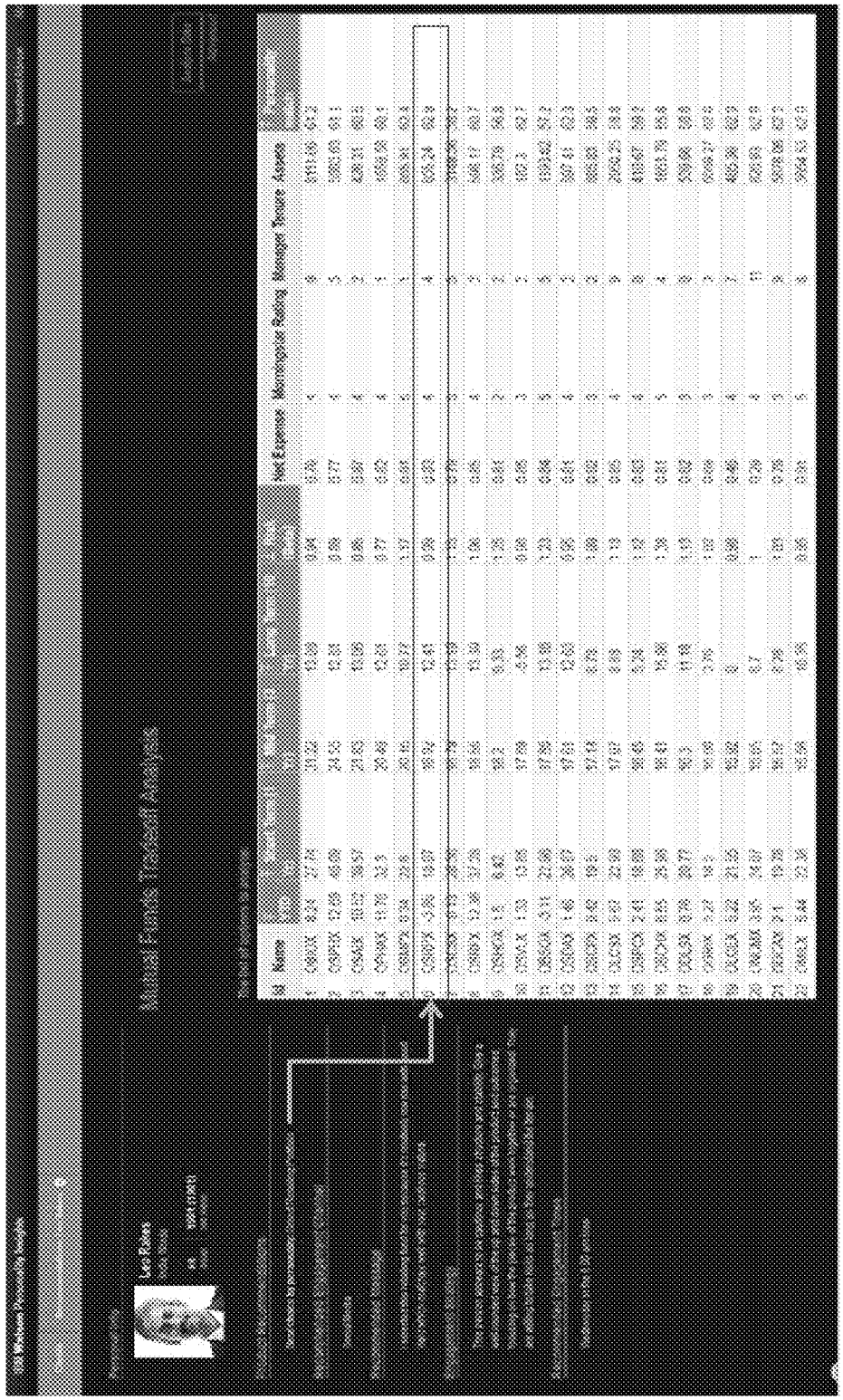
FIG. 6 illustrates an output recommending suitable funds or insurance plans for clients that match their personality and risk profile.

FIG. 5 illustrates a product recommendation for a given customer based on personality traits in accordance with an illustrative embodiment. FIG. 6 illustrates an output recommending suitable funds or insurance plans for clients that match their personality and risk profile.

Figure 7A:
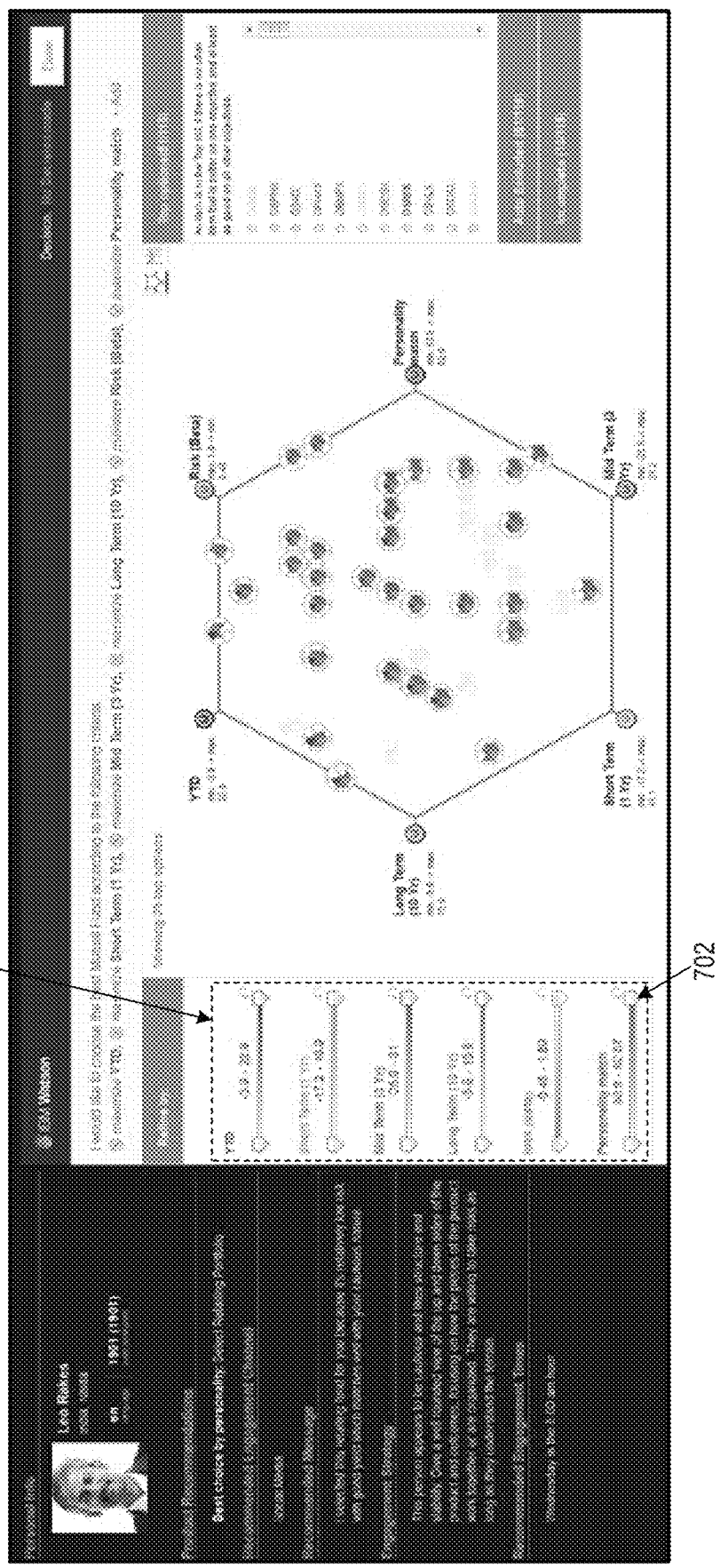
FIGS. 7A and 7B are diagrams illustrating how interactive decision support enables a customer to choose a product in accordance with an illustrative embodiment.
Figure 7B:
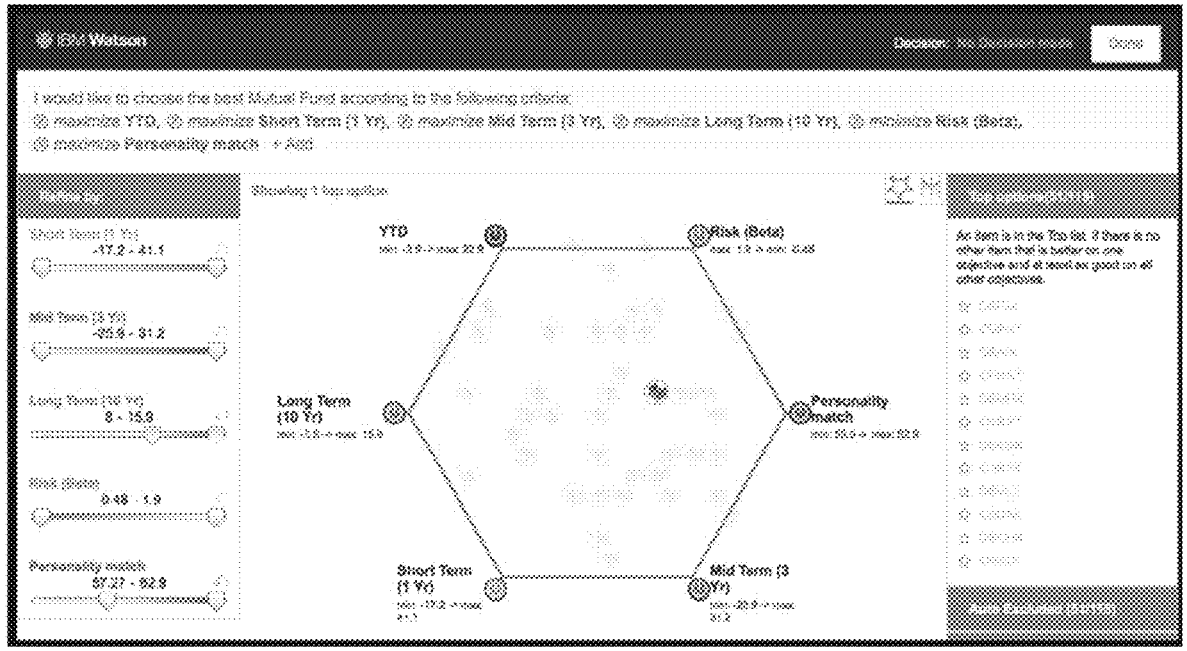

FIGS. 7A and 7B are diagrams illustrating how interactive decision support enables a customer to choose a product in accordance with an illustrative embodiment. As shown in FIG. 7A, the interface for interactive decision support provides slider controls 701 that allow the user, such as a sales agent, to modify criteria values used to determine a product recommendation. In particular product/customer match slider 702 allows the user to determine to what degree personality match is used to recommend a product. The user may use slider controls 701 to modify criteria, such as yield-to-date, mid-term return, long-term return, etc., along with fund/client personality match, to perform tradeoff analytics processing on the product recommendations. In one embodiment, the interactive decision support system may expose user traits at the individual level and let the user explore the tradeoffs. In the example shown in FIG. 7B, the user wants high personality match and high long-term yield. In the depicted example, there is only one fund matching these constraints.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
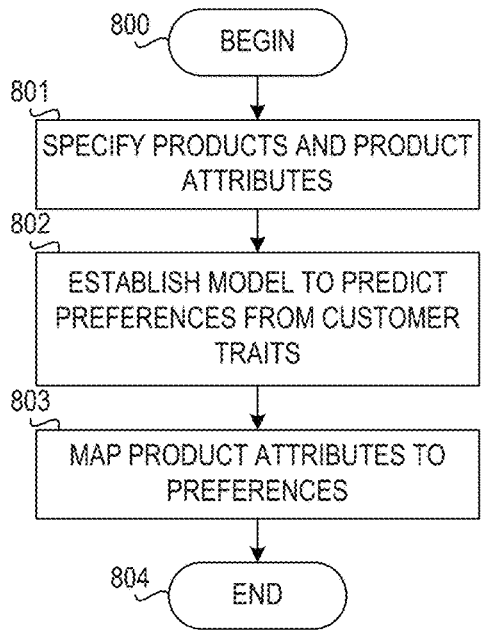
FIG. 8 is a flowchart illustrating operation of a mechanism for offering personalized and interactive decision support for product recommendations in accordance with an illustrative embodiment.

FIG. 8 is a flowchart illustrating operation of a mechanism for offering personalized and interactive decision support for product recommendations in accordance with an illustrative embodiment. Operation begins (block 800), and the mechanism specifies products and product attributes (block 801). The mechanism establishes a model to predict consumption preferences from customer traits (block 802). The model may be rule-based or may be a statistical machine learning model. In one embodiment, the model is based on a set of correlations between customer traits, such as personality traits, values, needs, intent, emotional status, etc., and a set of consumption preferences. These correlations may be derived by running statistical analysis on a set of observed data for people with their personality traits and their expressed or observed preferences. Data may be collected via surveys or from transactional data.

The mechanism then maps product attributes to consumption preferences (block 803). In one embodiment, this mapping is based on a set of correlations between consumption preferences and product attributes. These correlations can be obtained by conducting semantic analysis on product descriptions, for example. Thereafter, operation ends (block 804).

Figure 9:
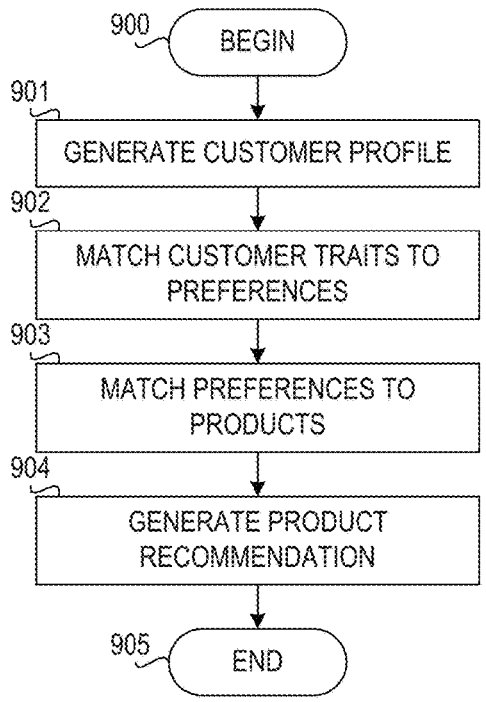
FIG. 9 is a flowchart illustrating operation of a mechanism for generating a product recommendation for a given customer based on preferences in accordance with an illustrative embodiment.

FIG. 9 is a flowchart illustrating operation of a mechanism for generating a product recommendation for a given customer based on preferences in accordance with an illustrative embodiment. Operation begins (block 900), and the mechanism generates a customer profile (block 901) by obtaining a set of customer traits. In one embodiment, the mechanism obtains the customer traits explicitly through surveys, for example. In another embodiment, to be described below with reference to FIG. 12, the mechanism generates the customer profile by performing linguistic analysis on customer-generated content, such as social media, email, demographics, etc.

The mechanism then matches the customer traits to consumption preferences using a customer trait-to-consumption preferences model (block 902). More specifically, the mechanism applies the customer traits to a set of correlation values that map customer traits to consumption preferences. The mechanism may then identify a subset of consumption preferences having a correlation value that is greater than a predetermined trait-preference threshold.

Next, the mechanism matches the subset of preferences to products using a consumption preference-to-product attribute mapping (block 903). More specifically, the mechanism applies the subset of preferences to a set of correlation values that map consumption preferences to product attributes. The mechanism may then identify a subset of product attributes having a correlation value that is greater than a predetermined preference-attribute threshold.

The mechanism generates a product recommendation identifying products having the subset of product attributes (block 904). Thereafter, operation ends.

Figure 10:
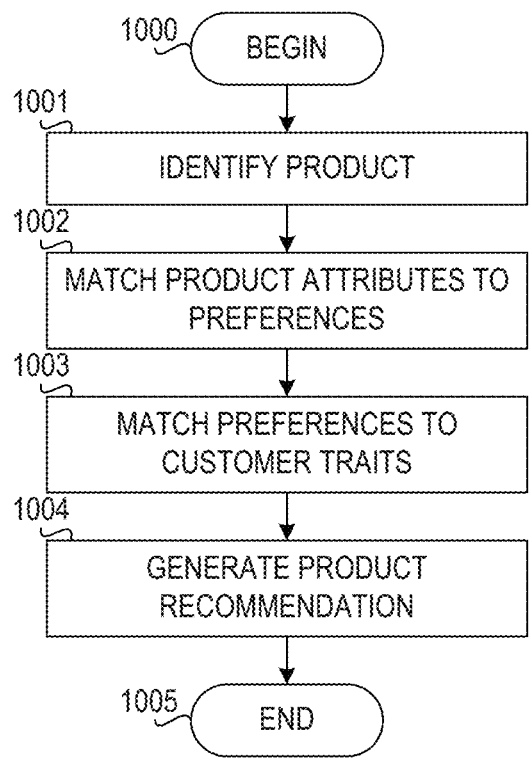
FIG. 10 is a flowchart illustrating operation of a mechanism for generating a product recommendation for a given product based on preferences in accordance with an illustrative embodiment.

FIG. 10 is a flowchart illustrating operation of a mechanism for generating a product recommendation for a given product based on preferences in accordance with an illustrative embodiment. Operation begins (block 1000), and the mechanism identifies a product (block 1001). The mechanism matches product attributes of the product to consumption preferences using a consumption preference-to-product attribute mapping (block 1002). More specifically, the mechanism applies the product attributes to a set of correlation values that map consumption preferences to consumption preferences. The mechanism may then identify a subset of consumption preferences having a correlation value that is greater than a predetermined preference-attribute threshold.

The mechanism matches the subset of consumption preferences to a set of customer traits using a customer trait-to-consumption preference model (block 1003). More specifically, the mechanism applies the subset of preferences to a set of correlation values that map consumption preferences to customer traits. The mechanism may then identify a subset of customer traits having a correlation value that is greater than a predetermined trait-preference threshold.

The mechanism generates a product recommendation identifying customers having the subset of customer traits that might be interested in the product (block 1004). Thereafter, operation ends (block 1005).

Figure 11:
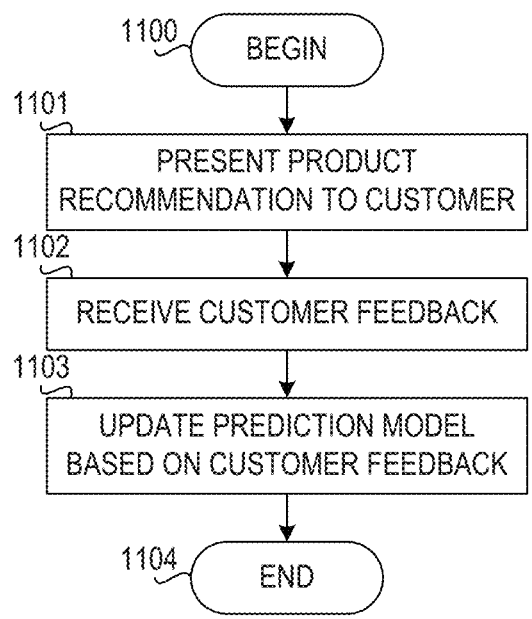
FIG. 11 is a flowchart illustrating operation of a mechanism for improving matching through customer feedback in accordance with an illustrative embodiment.

FIG. 11 is a flowchart illustrating operation of a mechanism for improving matching through customer feedback in accordance with an illustrative embodiment. Operation begins (block 1100), and the mechanism presents a product recommendation to a customer (block 1101). The presentation may use an interactive visualization that shows the recommended products, at least one customer trait, and at least one product attribute that are used in the matching to generate the recommendation. Because the visualization is interactive, it allows the customer to manipulate the visualization so that customers can give input to cause change in the matching to better reflect the preference. The mechanism receives the customer feedback (block 1102) and updates the prediction model based on the customer feedback (block 1103). Thereafter, operation ends (block 1104).

In one embodiment, the mechanism updates the model by updating rules of a rule-based customer trait-to-consumption preference model. In another embodiment, the mechanism updates a set of correlation values that map the customer traits to consumption preferences. In yet another embodiment, the mechanism performs a training algorithm to retrain a statistical machine learning model, such as a linear regression model.

Figure 12:
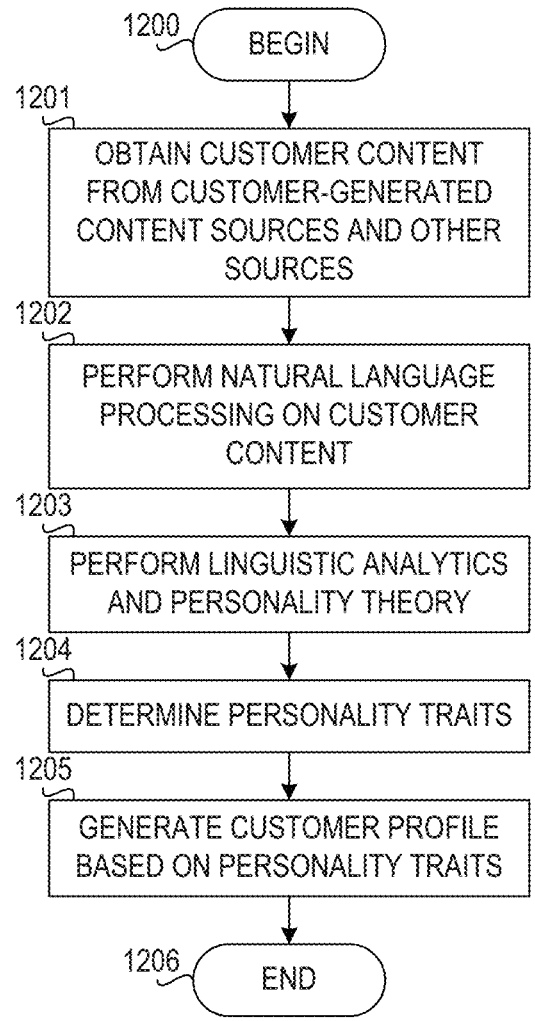
FIG. 12 is a flowchart illustrating operation of a mechanism for interactive decision support based on preferences derived from user-generated content sources in accordance with an illustrative embodiment.

FIG. 12 is a flowchart illustrating operation of a mechanism for interactive decision support based on preferences derived from user-generated content sources in accordance with an illustrative embodiment. Operation begins (block 1200), and the mechanism obtains customer content from customer-generated content sources and other sources (block 1201). The customer-generated content sources may include social media content, email or other electronic communications, and the like. Other sources of content may include enterprise data sources, demographic information, and the like.

Next, the mechanism performs natural language processing (1202) and performs linguistic analytics and personality insight theory (block 1203). In one embodiment, the mechanism may use an existing tool for determining personality traits about the customer. For example, the IBM Watson™ Personality Insights service provides an Application Programming Interface (API) that enables applications to derive insights from social media, enterprise data, or other digital communications. The mechanism then determines personality traits of the customer (block 1204) and generates a customer profile based on the personality and other customer traits (block 1205). Thereafter, operation ends (block 1206).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for offering personalized and interactive decision support to decision makers involving complex multi-objective decision choices. The mechanisms of the illustrative embodiments infer the customer's personality and preferences automatically from any available user generated content, such as text, audio, images, and videos. The mechanisms use this information to personalize the decision choices that are presented to the customer. By weeding out irrelevant decision choices, the illustrative embodiments save significant time for decision makers as they can focus on exploring tradeoffs among the choices that are more relevant.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a personalized interactive decision support system, the method comprising:

generating, by a customer profile generator executing within the personalized interactive decision support system, a set of personality traits for at least one customer by performing linguistic analysis on customer-generated content to derive the set of traits, wherein the customer-generated content comprises social media content;

correlating, by a personalized product recommendation module executing within the personalized interactive decision support system, the at least one customer to a set of consumption preferences using a machine learning model based on the set of personality traits of the at least one customer to form at least one customer-to-preference correlation;

mapping, by the personalized product recommendation module, a set of products to the set of consumption preferences using a consumption preferences-to-product attribute mapping data structure based on a set of attributes of the set of products to form a set of product-to-preference correlations;

matching, by the personalized product recommendation module, the at least one customer to at least one product within a set of products based on the at least one customer-to-preference correlation and the set of product-to-preference correlations to form a set of product recommendations;

generating, by a visual and interactive decision support module executing within the personalized interactive decision support system, a graphical user interface presenting the set of product recommendations to a user, wherein the graphical user interface comprises at least one slider control to modify criteria values used to determine the set of product recommendations, wherein the criteria comprise a degree to which personality match is used to determine the set of product recommendations;

responsive to a user interacting with the at least one slider control to generate feedback, adjusting, by a tradeoff analytics module executing within the personalized interactive decision support system, the set of product recommendations and updating, by a learning module executing within the personalized interactive decision support system, the machine learning model based on the feedback.

2. The method of claim 1, further comprising:
training the machine learning model based on statistical analysis of a set of observed data for customers with customer traits and expressed or observed preferences.

3. The method of claim 2, wherein the observed data is collected from surveys or transactional data.

4. The method of claim 2, wherein the machine learning model comprises a set of correlation values, wherein each correlation value in the set of correlation values represents a correlation between a customer trait and a consumption preference.

5. The method of claim 1, further comprising receiving an identification of the at least one customer to whom the at least one product is to be targeted, wherein presenting the set of product recommendations comprises presenting the at least one product to the at least one customer.

6. The method of claim 1, further comprising receiving an identification of the at least one product to be sold, wherein presenting the set of product recommendations comprises presenting the at least one customer to a sales agent such that the at least one customer is a recommended target for the at least one product.

7. The method of claim 1, wherein presenting the set of product recommendations comprises presenting evidence explaining the set of product recommendations.

8. The method of claim 1, wherein presenting the graphical user interface comprises a visualization that shows the at least one product, traits within the set of traits, and attributes within the set of attributes having a correlation contributing to the set of product recommendations.

9. The method of claim 8, wherein the visualization shows how the traits and the attributes correlate to the set of consumption preferences.

10. A computer program product comprising a computer readable storage medium having a computer readable program stored therein, wherein the computer readable program comprises instructions, which when executed on a processor of a computing device causes the computing device to implement a personalized interactive decision support system, wherein the computer readable program causes the computing device to:
  generate, by a customer profile generator executing within the personalized interactive decision support system, a set of personality traits for at least one customer by performing linguistic analysis on customer-generated content to derive the set of traits, wherein the customer-generated content comprises social media content;
  correlate, by a personalized product recommendation module executing within the personalized interactive decision support system, the at least one customer to a set of consumption preferences using a machine learning model based on the set of personality traits of the at least one customer to form at least one customer-to-preference correlation;
  map, by the personalized product recommendation module, a set of products to the set of consumption preferences using a consumption preferences-to-product attribute mapping data structure based on a set of attributes of the set of products to form a set of product-to-preference correlations;
  match, by the personalized product recommendation module, the at least one customer to at least one product within a set of products based on the at least one customer-to-preference correlation and the set of product-to-preference correlations to form a set of product recommendations;
  generate, by a visual and interactive decision support module executing within the personalized interactive decision support system, a graphical user interface presenting the set of product recommendations to a user, wherein the graphical user interface comprises at least one slider control to modify criteria values used to determine the set of product recommendations, wherein the criteria comprise a degree to which personality match is used to determine the set of product recommendations;
  responsive to a user interacting with the at least one slider control to generate feedback, adjust, by a tradeoff analytics module executing within the personalized interactive decision support system the set of product recommendations and update, by a learning module executing within the personalized interactive decision support system, the machine learning model based on the feedback.

11. The computer program product of claim 10, wherein the computer readable program further causes the computing device to:
  training the machine learning model based on statistical analysis of a set of observed data for customers with customer traits and expressed or observed preferences.

12. The computer program product of claim 11, wherein the observed data is collected from surveys or transactional data.

13. The computer program product of claim 11, wherein the machine learning model comprises a set of correlation values, wherein each correlation value in the set of correlation values represents a correlation between a customer trait and a consumption preference.

14. The computer program product of claim 10, wherein the computer readable program further causes the computing device to receive an identification of the at least one customer to whom the at least one product is to be targeted, wherein presenting the set of product recommendations comprises presenting the at least one product to the at least one customer.

15. The computer program product of claim 10, wherein the computer readable program further causes the computing device to receive an identification of the at least one product to be sold, wherein presenting the set of product recommendations comprises presenting the at least one customer to a sales agent such that the at least one customer is a recommended target for the at least one product.

16. The computer program product of claim 10, wherein presenting the set of product recommendations comprises presenting evidence explaining the set of product recommendations.

17. The computer program product of claim 10, wherein presenting the set of product recommendations comprises presenting a visualization that shows the at least one product and presenting traits within the set of traits and attributes within the set of attributes having a correlation contributing to the set of product recommendations.

18. A computing device comprising:
  a processor; and
  a memory coupled to the processor, wherein the memory comprises instructions, which when executed on the processor causes the computing device to implement a personalized interactive decision support system, wherein the instructions cause the processor to:
  generate, by a customer profile generator executing within the personalized interactive decision support system, a set of personality traits for at least one customer by performing linguistic analysis on customer-generated content to derive the set of traits, wherein the customer-generated content comprises social media content;
  correlate, by a personalized product recommendation module executing within the personalized interactive decision support system, the at least one customer to a set of consumption preferences using a machine learning model based on the set of personality traits of the at least one customer to form at least one customer-to-preference correlation;
  map, by the personalized product recommendation module, a set of products to the set of consumption preferences using a consumption preferences-to-product attribute mapping data structure based on a set of attributes of the set of products to form a set of product-to-preference correlations;
  match, by the personalized product recommendation module, the at least one customer to at least one product within a set of products based on the at least one customer-to-preference correlation and the set of product-to-preference correlations to form a set of product recommendations;
  generate, by a visual and interactive decision support module executing within the personalized interactive decision support system, a graphical user interface presenting the set of product recommendations to a user, wherein the graphical user interface comprises at least one slider control to modify criteria values used to determine the set of product recommendations, wherein the criteria comprise a degree to which personality match is used to determine the set of product recommendations;
  responsive to a user interacting with the at least one slider control to generate feedback, adjust, by a tradeoff analytics module executing within the personalized interactive decision support system, the set of product recommendations and update, by a learning module executing within the personalized interactive decision support system, the machine leaning model based on the feedback.

19. The computing device of claim 18, wherein the instructions further cause the processor to:
training the machine learning model based on statistical analysis of a set of observed data for customers with customer traits and expressed or observed preferences.

20. The computing device of claim 19, wherein the observed data is collected from surveys or transactional data.

21. The method of claim 1, wherein generating the set of personality traits for the at least one customer comprises accessing a personality insight service using an application programming interface.

22. The computer programming product of claim 10, wherein generating the set of personality traits for the at least one customer comprises accessing a personality insight service using an application programming interface.

23. The computing device of claim 18, wherein generating the set of personality traits for the at least one customer comprises accessing a personality insight service using an application programming interface.

* * * * *